US007506076B2

(12) United States Patent
Kobayashi

(10) Patent No.: US 7,506,076 B2
(45) Date of Patent: Mar. 17, 2009

(54) PROJECTOR, ITS CONTROL METHOD, AND DISPLAY DEVICE

(75) Inventor: Makoto Kobayashi, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 418 days.

(21) Appl. No.: 11/103,460

(22) Filed: Apr. 12, 2005

(65) Prior Publication Data

US 2005/0225729 A1    Oct. 13, 2005

(30) Foreign Application Priority Data

Apr. 13, 2004    (JP) .............................. 2004-117877

(51) Int. Cl.
H04N 1/00        (2006.01)
(52) U.S. Cl. ......................................... 710/8; 345/204
(58) Field of Classification Search .................... 704/8; 710/8, 10; 349/6, 7; 345/178, 212, 440, 345/536; 348/14, 553, 563; 370/260, 310; 379/202.01; 382/254; 725/46, 36; 715/716, 715/740, 759, 788, 810, 827
See application file for complete search history.

(56) References Cited

U.S. PATENT DOCUMENTS

| 5,659,337 | A  | * | 8/1997  | Tanaka et al. ................... 704/8   |
| 5,795,048 | A  | * | 8/1998  | Umei ......................... 353/122   |
| 5,859,623 | A  | * | 1/1999  | Meyn et al. .................. 715/730   |
| 6,693,629 | B1 | * | 2/2004  | Naito ......................... 345/418   |
| 6,879,349 | B2 | * | 4/2005  | Nishida et al. .............. 348/553   |
| 6,956,490 | B2 | * | 10/2005 | Childers ..................... 340/641   |
| 7,180,475 | B2 | * | 2/2007  | Slobodin et al. ............. 345/2.3   |
| 7,197,562 | B2 | * | 3/2007  | Murtha et al. ............... 709/224   |
| 7,224,847 | B2 | * | 5/2007  | Zhang et al. ................. 382/254   |
| 7,362,944 | B2 | * | 4/2008  | Kim ............................. 386/46   |
| 2002/0122158 | A1 | * | 9/2002 | Miyashita et al. ............. 353/30   |
| 2003/0028637 | A1 | * | 2/2003 | Gross ......................... 709/225   |
| 2003/0072429 | A1 | * | 4/2003 | Slobodin et al. ........ 379/202.01   |
| 2003/0174127 | A1 | * | 9/2003 | Oka et al. .................... 345/204   |
| 2003/0236889 | A1 | * | 12/2003 | Manion et al. ............. 709/227   |
| 2004/0073925 | A1 | * | 4/2004 | Kinoshita .................... 725/46   |
| 2004/0085570 | A1 | * | 5/2004 | Sfaelos et al. ............. 358/1.15   |
| 2005/0039133 | A1 | * | 2/2005 | Wells et al. ................. 715/740   |

FOREIGN PATENT DOCUMENTS

| EP | 0 589 068 A1 | 3/1994 |
| EP | 0 772 356 A2 | 5/1997 |
| JP | A-07-095492 | 4/1995 |

(Continued)

OTHER PUBLICATIONS

InFocus, LP120 User's Guide, 2002, InFocus, pp. 1-46.*

*Primary Examiner*—Henry W. H. Tsai
*Assistant Examiner*—Cheng-Yuan Tseng
(74) *Attorney, Agent, or Firm*—Oliff & Berridge, PLC

(57) ABSTRACT

Aspects of the invention can provide a projector which can change dynamically the number of languages and the kinds of the language that can be displayed in an OSD menu, and reflects its change in a user interface through a network, establishing synchronization. The projector can output, so that a computer connected to the projector through a network line can display data relating to the projector, on a monitor screen of the computer, with the same language type as a language type of an OSD menu of the projector, an image data set corresponding to its language type to the network line.

16 Claims, 14 Drawing Sheets

FOREIGN PATENT DOCUMENTS

| | | |
|---|---|---|
| JP | A 7-95492 | 4/1995 |
| JP | A-2000-069398 | 3/2000 |
| JP | A 2001-022491 | 1/2001 |
| JP | 2001-230050 * | 7/2001 |
| JP | 15046892 * | 2/2003 |
| JP | A-2003-084748 A | 3/2003 |
| JP | A-2003-173177 | 6/2003 |
| JP | A 2003-198994 | 7/2003 |

* cited by examiner

In change of user setting

Inquiry of user setting

PROJECTOR, ITS CONTROL METHOD, AND DISPLAY DEVICE

BACKGROUND

Aspects of the invention can relate to a projector that displays an OSD menu with plural languages, its control method, and a display device.

SUMMARY

A related art television apparatus can display a menu display with different languages. See, for example, JP-A-7-95492. Further, a projector directly connected to a network line, such as Internet, has been developed for example, JP-A-2003-198994.

The number of languages and kinds of language to which a projector should correspond are different according to a country or an area (Europe, Asia, and the like) in which the projector is used. Accordingly, it can be desirable that the projector is constituted so that the necessary number of the necessary languages for each country or each area is chosen and they can be mounted. Here, correspondence of the projector to a language can mean at least one of the following: 1) an OSD menu is displayed with its language, and 2) a message is displayed with its language in a display part provided for a projector body or a remote controller.

The above projector can be controlled also through a computer connected to a network line. For example, the projector can be controlled by a user through a user interface image appearing on a monitor screen of such the computer. Here, it is desirable that such the user interface image correspond to various languages similarly to the OSD menu that the projector projects. There is a case where it is desirable that the language of the user interface image automatically coincides with that of the OSD menu.

Aspects of the invention has been made in view of the above problems. An object of the invention is to provide a projector which can change the number of the corresponding languages and the kind of the corresponding language dynamically, and reflects its change in a user interface through a network, establishing synchronization.

An exemplary projector of the invention can include a projection part which projects a menu image including at least one part according to an image signal, a selection part which causes a user to select a language type of the menu image, a menu image processing part which generates the image signal so that a character array of the selected language type can appear in the menu image as the part, and an additional function part which outputs an image data set to a network line. Further, the additional function part, so that a computer connected to the additional function part through the network line can display data relating to the projector, on a monitor screen of the computer, with the selected language type, outputs the image data set corresponding to the selected language type to the network line.

One of effects obtained by the above constitution is that the computer connected to the projector through the network line can display the data relating to the projector with the same language type as the language type of the menu image that the projector projects. The data relating to projector corresponds to a user interface image for setting a parameter of the projector, data indicating cumulative lightening time of a lamp, and the like.

The invention can be realized not only in a form of the projector but also in a form of a display device. Here, the display device includes a CRT monitor, a liquid crystal monitor, an electroluminescent display device, a plasma display device, SED (Surface-Conduction Electron-Emitter Display), and FED (Field Emission Display)

In a mode of the invention, the menu image processing part can include a data defining part having plural memory areas which store respectively character array data of respective language types, in which plural indexes are assigned to the plural memory areas one by one, a first index storing part which stores one of the plural indexes according to the selection by a user, a first CPU which takes out, according to the stored index, the character array data from the corresponding memory area in case that a command for projecting the menu image is given, and an image generating part which generates the image signal according to the taken-out character array data so that the character array can appear in the menu image as the part.

One of effects obtained by the above constitution is that according to user's selection, the projector can select the menu image of one language type from the menu images of the plural language types, can project it, and can store the language type selected by the user. Preferably, each of the plural memory areas store further each identifier indicating the language type of the character array data stored in each of the plural memory areas.

One of effects obtained by the above constitution is that the projector can grasp a corresponding relation between the memory area and the language type.

In another mode of the invention, the additional function part can include a data table which stores the plural indexes and the respective identifiers in a corresponding relation, a second CPU which takes out, according to the index stored in the first index storing part, the corresponding identifier from the table data in case that a predetermined command is given through the network line, and an image data storing part which outputs the image data set representing the data according to the taken-out identifier.

One of effects obtained by the above constitution is that the computer connected through the network line to the projector can display, with the same language type as the language type of the menu image that the projector projects, the data relating to the projector.

In another mode of the invention, the data table receives each identifier stored in each of the plural memory areas in start of the projector, and stores the plural indexes and the respective identifier in a corresponding relation. One of effects obtained by the above constitution is that: even after character array data of the predetermined language type in a memory area has been replaced with character array data of another language type, the projector can grasp the corresponding relation between the memory area and the language type.

In another mode of the invention, the additional function part has a second index storing part which stores the same index as the index stored in the first index storing part; and the second CPU takes out, according to the index stored in the second index storing part, the corresponding identifier from the data table. One of effects obtained by the above constitution is that control becomes easier.

In another mode of the invention, in case that the index stored in the first index storing part has been changed according to selection of the language type by a user, an index after change stored in the first index storing part is transferred to the second index storing part so that the second index storing part stores the index after change. One of effects obtained by the above constitution is that the second index storing part is renewed according to renewal of the first index storing part.

Therefore, the second index storing part can always store the same index as the index in the first index storing part.

In another mode of the invention, the index stored in the first index storing part is transferred to the second index storing part at the predetermined timing so that the second index storing part can store the same index as the index stored in the first index storing part. One of effects obtained by the above constitution is that the second index storing part can always store the same index as the index stored in the first index storing part.

A control method of the invention is a method of a projector provided with a projection part that projects, according to an image signal, a menu image including at least one part. This method can include a step A of causing a user to select a language type of the menu image, a step B of generating the image signal so that a character array of the selected language type can appear as the part in the menu image, and a step C of outputting an image data set to a network line. Further, the step C includes a step C1 of outputting an image data set corresponding to the selected language type to the network line so that a computer connected to the network line can display, on a monitor screen of the computer, data relating to the projector with the selected language type. One of effects obtained by the above constitution is that the computer connected through the network line to the projector can display the data relating to the projector with the same language type as the language type of the menu image projected by the projector.

In a mode of the invention, the projector has further a data defining part having plural memory areas which store respectively character array data of the respective language type, in which plural indexes are assigned to the plural memory areas one by one; and a first index storing part. Further, the step B includes a step B1 of storing one of the plural indexes in the first index storing part according to the selection by the user, a step B2 of taking out the character array data from the corresponding memory area according to the index stored in the first index storing part, and a step B3 of generating the image signal, according to the taken-out character array data, so that the character array can appear as the part in the menu image. One of effects obtained by the above constitution is that the projector can select, according to user's selection, a menu image of one language type from the menu images of the plural language types, project it, and can store the language type selected by the user.

In another mode of the invention, each of the plural memory areas further stores each identifier indicating the associated language type, and the projector further has a data table which stores the plural indexes and the respective identifiers in a corresponding relation. Further, the step C1 includes a step C11 of taking out, according to the index stored in the first index storing part, the corresponding identifier from the data table, and a step C12 of outputting, according to the taken-out identifier, the image data set representing the data to the network line. One of effects obtained by the above constitution is that the computer connected through the network to the projector can display, with the same language type as the language type of the menu image projected by the projector, the data relating to the projector.

In another mode of the invention, the step C1 includes a step C13 of taking out, in start of the projector, each identifier stored in each of the plural memory areas, and storing the plural indexes and the respective identifiers in the data table in a corresponding relation. One of effects obtained by the above constitution is that: even after character array data of the predetermined language type in a memory area has been replaced with character array data of another language type, the projector can grasp the corresponding relation between the memory area and the language type.

In another mode of the invention, the projector has a second index storing part. Further, the step C11 can include a step of storing the same index as the index stored in the first index storing part in the second index storing part, and a step of taking out, according to the index stored in the second index storing part, the corresponding identifier from the data table. One of effects obtained by the above constitution is that control becomes easier.

In another mode of the invention, the step C11 can include a step of, in case that the index stored in the first index storing part has been changed according to selection of the language type by the user, transferring an index after change stored in the first index storing part to the second index storing part so that the second index storing part stores the index after change. One of effects obtained by the above constitution is that the second index storing part is renewed according to renewal of the first index storing part. Therefore, the second index storing part can always store the same index as the index in the first index storing part.

In another mode of the invention, the step C11 can include a step of transferring the index stored in the first index storing part to the second index storing part at the predetermined timing so that the second index storing stores the same index as the index stored in the first index storing part. One of effects obtained by the above constitution is that the second index storing part can always store the same index as the index stored in the first index storing part.

A projector of the invention can include a projection part which projects a menu image including at least one part according to an image signal, a selection part which causes a user to select a language type of the menu image, a menu image processing part which generates the image signal so that a character array of the selected language type can appear as the part in the menu image, and an additional function part to be connected to a network line. Further, the additional function part outputs a language identifier representing the selected language type to a computer connected to the network line.

One of effects obtained by the above constitution is that it is possible to obtain a projector which causes the computer connected to the network line to recognize what the language type of an OSD menu (menu image) of the projector is.

A control method of the invention is a control method of a projector provided with a projection part that projects, according to an image signal, a menu image including at least one part. This method can include a step A of causing a user to select a language type of the menu image, a step B of generating the image signal so that a character array of the selected language type can appear as the part in the menu image; and a step C of outputting a language identifier representing the selected language type to a computer connected to a network line. One of effects obtained by the above constitution is that it is possible to cause the computer connected to the network line to recognize what the language type of the OSD menu (menu image) of the projector is.

BRIEF DESCRIPTION OF THE DRAWINGS

The invention will be described with reference to the accompanying drawings, wherein like numerals reference like elements, and wherein.

DETAILED DESCRIPTION OF EMBODIMENTS

Figure 1:
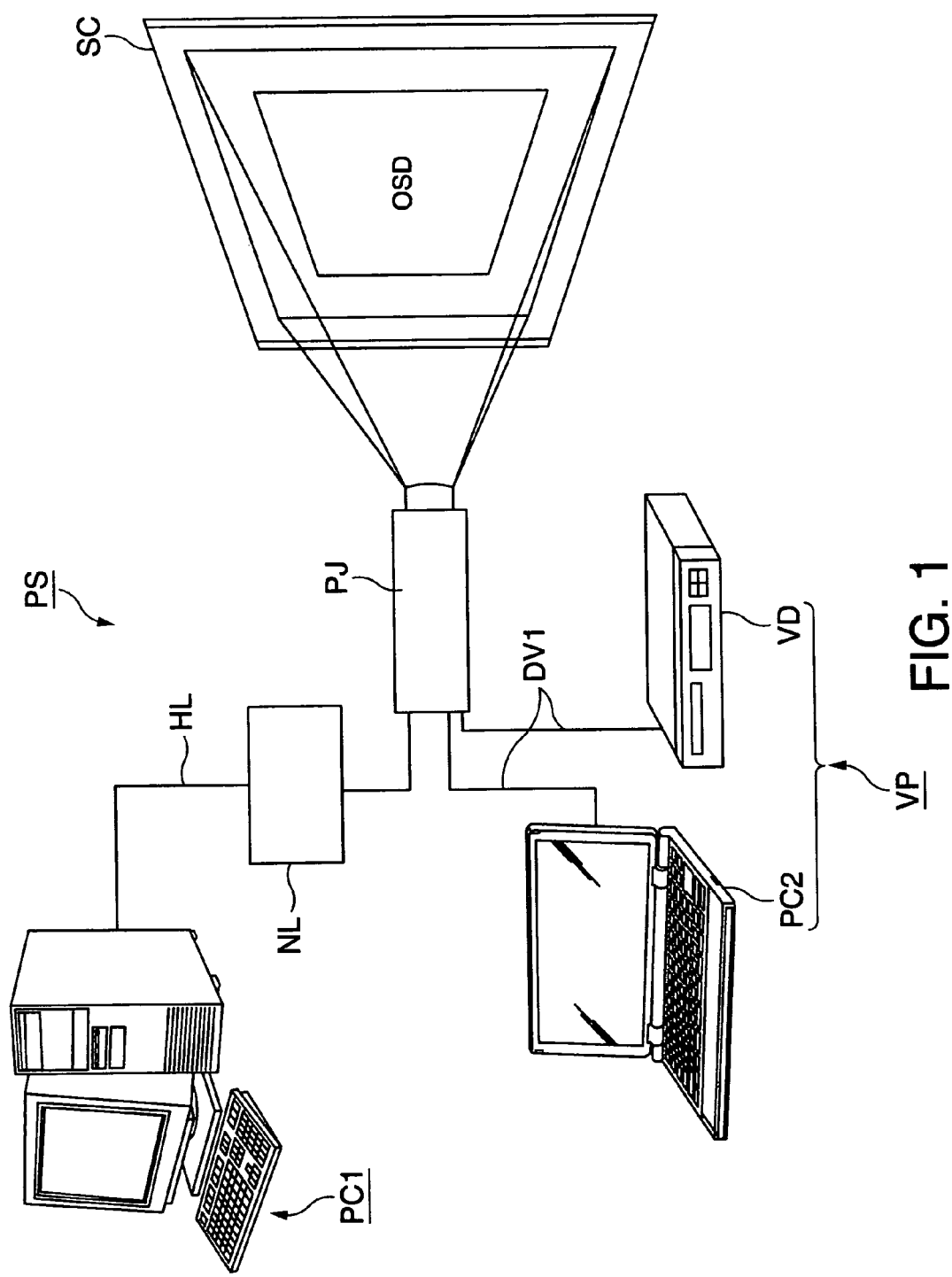
FIG. 1 shows a schematic diagram showing a projector system.

A projector system PS shown in FIG. 1 can include a projector PJ, a screen SC, an image supply device VP that supplies an image signal DV1 to the projector PJ, and a computer PC 1 connected to the projector PJ through network lines NL such as LAN (Local Area Network) and Internet. The image supply device VP may be a personal computer PC2 or a video reproducing device VD, such as a DVD player. The projector PJ projects, on the screen SC, an image according to the image signal DV1 from such the image supply device VP.

The projector system PS makes it possible that the user sets various parameters of the projector PJ on a monitor screen of the computer PC1. Here, the various parameters of the projector PJ can mean, for example, brightness of an image projected by the projector PJ, color temperature, contrast, black level, color mode, sharpness, a display position of an image, and a language type to which a character array displayed in a projected menu image belongs. In the embodiment, though the single computer PC1 is connected to the projector PJ through the network line NL for convenience, actually, plural computers PC 1 can be connected to the projector PJ through the network line NL.

As described in greater detail below, an IP address is assigned to the projector PJ. Further, the projector PJ functions, on the network line NL, also as a server computer. Further, according to access by a browser executed on the computer PC1, the projector PJ supplies an image data set HL representing a user interface image to the computer PC1. The computer PC1, on the basis of the supplied image data set HL, displays the user interface image on the monitor screen. On the other hand, the user, while seeing the user interface image on the monitor screen, operates a mouse or a keyboard of the computer PC1, and can set the parameter of his desire. Thus, the projector PJ realizes environment in which the user can set the various parameters through the computer PC1.

The above parameters can be set also from the menu image that the projector PJ projects. While the projector PJ operates, in case that the user pushes on a menu button MB (FIG. 4), the projector PJ projects the menu image. Here, the menu image is projected so as to cover a part of the image that has been already projected. Further, the menu image can be represented also as an OSD menu. The OSD is an abbreviation of On Screen Display.

Figure 2A:
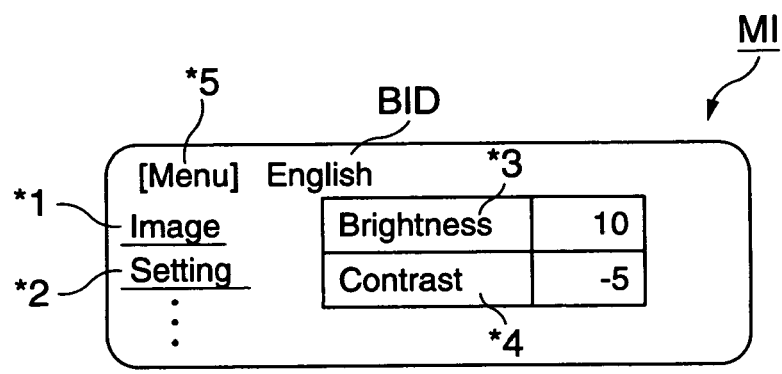
FIG. 2A is a diagram showing an English OSD menu.
Figure 2B:
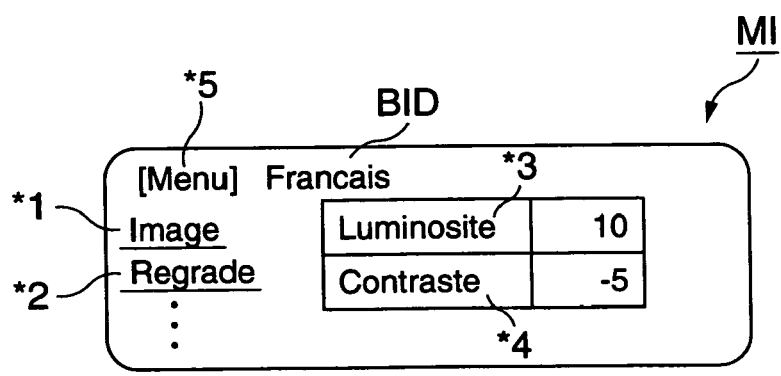
FIG. 2B is a diagram showing a French OSD menu.

On menu images MI shown in FIGS. 2A and 2B, plural parameters are listed up. The user operates a pointing button PB (FIG. 4) to select a parameter of his desire from the listed-up parameters, and can set its selected value. Here, FIG. 2A shows an English menu image MI, and FIG. 2B shows a French menu image MI. These menu images MI are displayed so as to overlap on the image supplied from the image supply device VP.

Further, as shown in FIGS. 2A and 2B, the menu image MI includes at least one part. Here, the part means a character array and a graphic included in the menu image MI. However, in the embodiment, in order to simplify the description, only the character array is described as the part. For example, in FIG. 2A, each character array of Image, Setting, Brightness, Contrast, and Menu is the part, and in FIG. 2B, each character array of Image, Regrade, Luminosite, Contraste, and Menu is the part.

Further, English in the menu image MI of FIG. 2A, and Francais in the menu image MI of FIG. 2B are bit map images BID represented by respective bit map data (described below). Namely, these two parts are graphics.

To the parts shown in FIGS. 2A and 2B, part identifiers described later in FIG. 6 are assigned. In case of FIG. 2A, to the respective parts, the part identifiers of *1 to *5 are assigned without an overlap. Further, of the parts in FIG. 2, both of Brightness and Luminosite can be a parameter of brightness, and both of Contrast and Contraste can be a parameter of contrast.

Further, the projector PJ can cause the user to select a language type of the menu image MI. Consequently, the menu image MI can be displayed with the language type selected by the user. For example, in case that the user selects a language type of English, the projector PJ projects the English menu image MI shown in FIG. 2A. On the other hand, in case that the user selects a language type of French, the projector PJ projects the French menu image MI shown in FIG. 2B. Thus, the projector PJ can project menu the images MI of the plural language types that are different from each other.

In the exemplary embodiment, the language type of the menu image MI coincides with the language type of the user interface image appearing on the monitor screen of the computer PC1. When the user changes the language type of the menu image MI (that is, OSD menu), not only the language type of the menu image MI but also the language type of the user interface image on the computer PC1 is similarly changed. Here, the user interface image in the embodiment corresponds to data relating to projector of the invention. Further, on the user interface image in the embodiment, data such as cumulative lightening time of a light source 22 (FIG. 3) is also displayed.

The constitution of the projector PJ that realizes the above function will be described below in detail.

Figure 3:
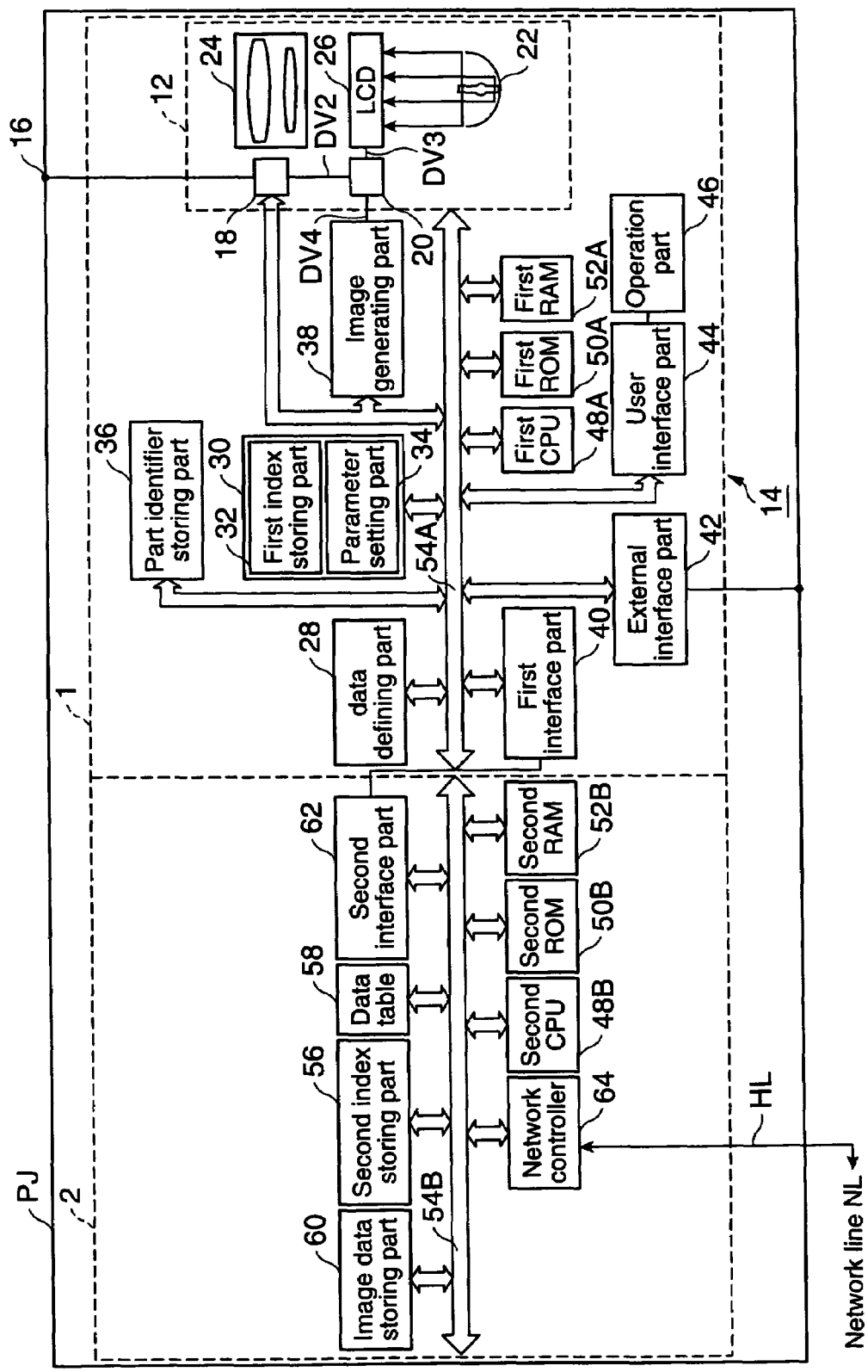
FIG. 3 is a schematic diagram showing the inner constitution of a projector.

A projector PJ shown in FIG. 3 has a main function part 1 and an additional function part 2. The main function part 1 of them takes a basic function of the projector PJ upon itself. Specifically, the main function part 1 has a function of processing the image signal DV1 from the image supply device VP so that the projector PJ can project the image from the image supply device VP. Further, the main function part 1 has also a function of generating, so that the projector PJ can project an OSD menu belonging to the predetermined language type, an image signal representing the OSD menu.

Further, the main function part 1 has also a function of, in case that the user has switched the language type of the OSD menu, spontaneously transmitting data representing the newly set language type (later-described index) to the additional function part 2.

On the other hand, the additional function part 2 takes a function as a server computer of the projector PJ upon itself. For example, the additional function part 2 outputs the image data set HL to the computer PC 1 so that the user can perform setting of the projector PJ on the computer PC1 through a network line NL such as Internet. Here, when the additional function part 2 outputs the image data set HL, it selects, on the basis of the data given from the main function part 1, the corresponding image data set HL so that the language type of the user interface image can coincide with the language type of the OSD menu.

It is preferable that the additional function part 2 can be mounted on one print board and it is so constituted as to be removably attached to the main function part 1 of the projector PJ arbitrarily. As shown in FIG. 3, this projector PJ, also in a state where the additional function part 2 is not attached to the main function part 1, can project an image according to the image signal DV1 supplied from the outside. In case that the additional function part 2 is thus removably attached to the projector PJ arbitrarily, both of the projector PJ having the function of the addition function part 2 and the projector PJ having no function of the addition function part 2 can be readily constituted. Therefore, the user, after buying a projector having no additional function part 2, can buy an additional function part 2 separately and add it to the projector. The main function part 1 and the additional function part 2 will be described below in detail in this order.

As shown in FIG. 3, the main function part 1 has a projection part 12 and a menu image processing part 14.

The projection part 12 can include an external input terminal 16, an image processing part 18, an image superposing part 20, a light source 22, a projection optical system 24, and a spatial light modulator 26. To the external input terminal 16, an image signal DV1 is supplied from the image supply device VD.

The image processing part 18 has a PLL synchronous circuit and a frame memory which are not shown. Further, the image processing part 18, according to the image signal DV 1 supplied to the external input terminal 16, generates an image signal DV 2 suited to drive the spatial light modulator 26. By such the function of the image processing part 18, even if the resolution/synchronous frequency of the image signal DV1 is different from the resolution/synchronous frequency inherent to the spatial light modulator 26, the image represented by the image signal DV 1 is projected by the projector PJ. Namely, by the image processing part 18, the projector PJ can project the image according to the plural image signals DV 1 which are different in resolution and synchronous frequency from each other.

The image superposing part 20, on the basis of a menu image signal DV4 from the menu image processing part 14 and the image signal DV2, generates an image signal DV3. Here, the image signal DV3 represents an image in which the menu image MI is superposed on the predetermined region of the image represented by the image signal DV2. In case that the menu image MI is not displayed, the image signal DV 3 is the same as the image signal DV2.

The spatial light modulator 26 modulates a luminous flux from the light source 22 according to the image signal DV3 from the image superposing part 20. The spatial light modulator 26 in the exemplary embodiment can include a liquid crystal light bulb and a driver circuit. Here, the driver circuit is a circuit which drives an active element of the liquid crystal light bulb on the basis of the image signal DV3. The luminous flux modulated by the spatial light modulator 26 is projected through the projection optical system 24. The projector PJ thus projects an image according to the image signal DV1 given to the external input terminal 16.

The menu image processing part 14 includes a data defining part 28, a set value storing part 30, a part identifier storing part 36, an image generating part 38, a first interface part 40, an external interface part 42, a user interface part 44, an operation part 46, a first central processing unit (CPU) 48A, a first ROM 50A, a first RAM 52A, and a first bus 54A which connects these parts communicatably.

The data defining part 28 is realized by a semi-conductive memory that can be rewritten. The data defining part 28 in the exemplary embodiment has an EEPROM.

Figure 5:
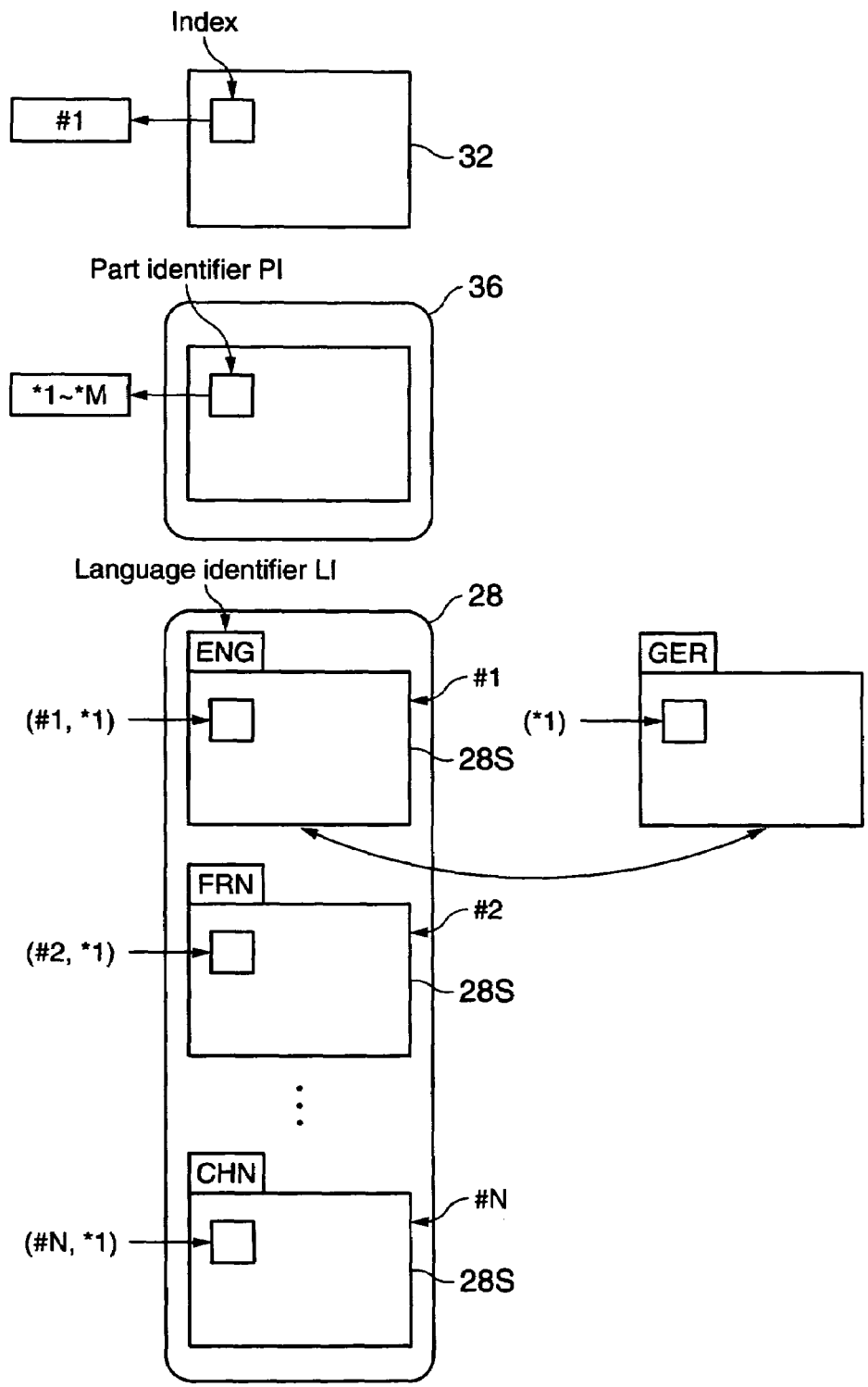
FIG. 5 is a conceptual diagram of a data defining part.

As shown in FIG. 5, the data defining part 28 has plural memory areas 28S. As described later, each of the plural memory areas 28S stores a structure-type data set. Further, to the plural memory areas 28S, plural indexes are respectively assigned. Namely, to the plural memory areas 28S, the plural indexes are assigned one by one. For example, as shown in FIG. 5, to the memory areas 28S of N-number, the indexes #1, #2, -#N are respectively assigned.

Further, with the plural memory areas 28S, plural language types that are different from each other are respectively associated. Namely, with the plural memory areas 28S, the plural language types are associated one by one. For example, with the memory area 28S of #1 (memory area #1), an English language type is associated, while with the memory area 28S of #2 (memory area #2), a French language type is associated, and to the memory area 28S of #3 (memory area #3), a Japanese language type is associated.

Figure 6A:
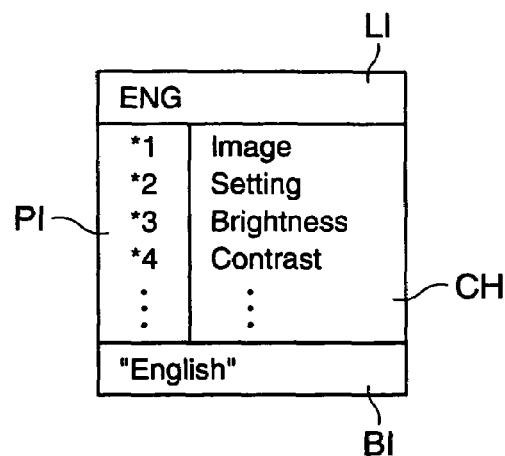
FIGS. 6A-6C are schematic diagrams showing a language data set in the data defining part.
Figure 6B:
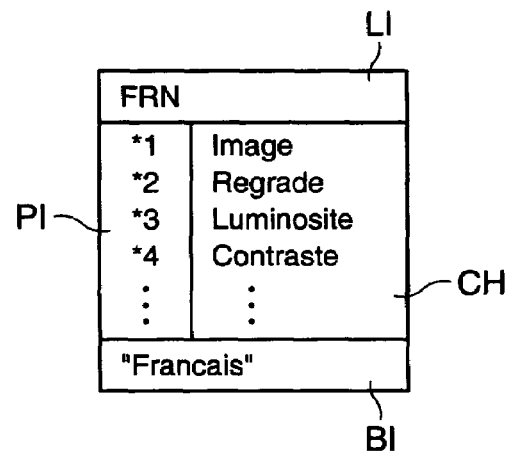
Figure 6C:
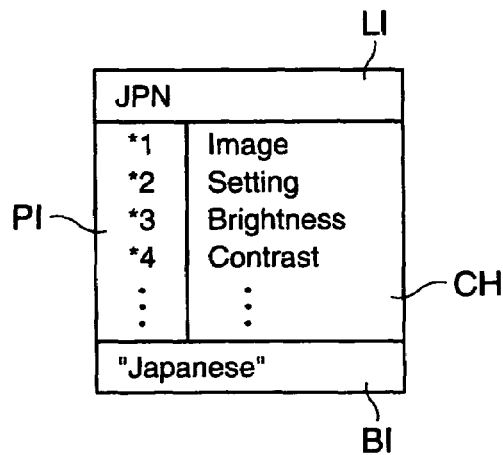

As shown in FIGS. 6A-6C, each of the plural memory areas 28S stores character array data CH of the associated language type. For example, the memory area #1 with which the English language type is associated stores character array data CH representing an English character array. In the exemplary embodiment, as shown in FIG. 6A, the memory area #1 stores character array data CH representing Image, character array data CH representing Setting, character array data CH representing Brightness, and character array data CH representing Contrast. As shown in FIGS. 6B and 6C, other memory areas #2 and #3 store similarly character array data CH of the associated language types.

As shown in FIGS. 6A-6C, in each of the plural memory areas 28S, these character array data CH are stored in association with part identifiers PI. Here, the part identifier PI is data which specifies the part included in the menu image MI. As described in FIG. 2, the part means the character array and the graphic included in the menu image MI. However, in the exemplary embodiment, in order to simplify the description, only the character array is described as the part. As shown in FIG. 6A, in the memory area #1, the character data CH representing Image is associated with a part identifier PI of *1, the character data CH representing Setting is associated with a part identifier PI of *2, the character data CH representing Brightness is associated with a part identifier PI of *3, and the character data CH representing Contrast is associated with a part identifier PI of *4.

Also in other memory areas 28S, with a character array representing the same meaning as the meaning of the character array in the memory area #1, the same part identifier PI is associated. For example, as shown in FIG. 6B, in the memory area #2, the character data CH representing Image is associated with the part identifier PI of *1, the character data CH representing Regrade is associated with the part identifier PI of *2, the character data CH representing Luminosite is associated with the part identifier PI of *3, and the character data CH representing Contraste is associated with the part identifier PI of *4. Thus, with the character array data CH corresponding to the same part, the same part identifier PI is associated.

Further, as shown in FIGS. 6A-6C, in each of the plural memory areas 28S, a language identifier LI indicating the associated language type is also stored. As shown in FIG. 6A, since the language type associated with the memory area #1 is English, a language identifier ENG meaning English is stored in the predetermined location of the memory area #1. Similarly, as shown in FIG. 6B, a language identifier FRN meaning French is stored in the predetermined location of the memory area #2. Further, as shown in FIG. 6C, a language identifier JPN meaning Japanese is stored in the predetermined location of the memory area #3. In other memory areas 28S, also, the corresponding language identifiers LI are similarly stored.

As shown in FIGS. 6A-6C, each of the plural memory areas 28S has bit map data BI corresponding to the associated language type. Specifically, as shown in FIG. 6A, the memory area #1 associated with the English language type stores bit map data BI for displaying a bit map image BID of English. Similarly, as shown in FIG. 6B, the memory area #2 associated with the French language type stores bit map data BI for displaying a bit map image BID of Francais. Further, as shown in FIG. 6C, the memory area #3 associated with the Japanese language type stores bit map data BI for displaying a bit map image BID that consists of the letter of Japanese that shows the meaning called Japanese.

In case that the language menu is projected, these bit map data BI are processed by the image generating part 38, and the bit map images BID of English, Francais, and the like appear on a language menu as a list. The language menu is an OSD menu which can make the user select one language type, and also a kind of user interface image. Further, the language menu is one of lower-class menus of the OSD menu.

In the embodiment, the above structure-type data sets stored respectively in the plural memory areas 28S are expressed also by language data LDS. According to this expression, the memory area #1 in FIGS. 5 and 6 stores a language data set LDS in which the language type is English. On the other hand, the memory area #2 stores a language data set LDS in which the language type is French. Further, the memory area #3 stores a language data set LDS in which the language type is Japanese.

Further, the association of the language type with the memory area 28S can be changed dynamically. In the embodiment, to change the association of the language type with a memory area 28S is synonymous with to replace a language data set LDS of a language type stored in its memory area 28S with a language data set LDS of another language type. In case that the language data set LDS is replaced, a language data set LDS of a new language type is supplied through the external interface part 42 to the data defining part 28 from a not-shown external data processing device. Further, within a range of total capacity of the data defining part 28, the number of the memory areas 28S can increase or decrease. In accordance with the increase or decrease in the number of the memory areas 28S, the number of the language data sets LDS which the data defining part 28 stores also increases or decrease.

In case that the part identifier PI and one index are supplied to the data defining part 28 storing the above structure-type data set, the data defining part 28 outputs, from the memory area 28S corresponding to the supplied one index, the character array data CH corresponding to the supplied part identifier PI.

The set value storing part 30 shown in FIG. 3 is realized by a rewritable semi-conductive memory. This set vale storing part 30 has a first index storing part 32 and a parameter setting part 34. The first index storing part 32 holds an index which specifies any one of the plural memory areas 28S in the data defining part 28. On the other hand, the parameter setting part 34 stores values of the parameters relating to the projector PJ. Their parameter values can be rewritten each time they are changed by the user.

The part identifier storing part 36 shown in FIG. 3 stores plural part identifiers PI. As described before, the part identifier PI is data which specifies the part included in the menu image MI, while the part can mean a character array and a graphic included in the menu image MI.

The image generating part 38 shown in FIG. 3, according to the character array data CH from the data defining part 28, and a control code corresponding to the character array data CH, generates a menu image signal DV4 representing the menu image MI. Here, the control code includes data indicating a position in which the corresponding character array should be displayed, and data indicating the size of the corresponding character array.

The generated menu image signal DV4 is supplied to the before-described projection part 12. Specifically, the menu image signal DV4 is supplied to the image superposing part 20 in the projection part 12. To the image superposing part 20, the image signal DV2 from the image processing part 18 is also supplied. The image superposing part 20, on the basis of the menu image signal DV4 and the image signal DV2, generates an image signal DV3. Here, the image signal DV3 represents an image in which the menu image MI expressed by the menu image signal DV4 is superpose on the predetermined region of the image expressed by the image signal DV2. In case that the menu image MI is not displayed, the image signal DV 3 is the same as the image signal DV2. The generated image signal DV3 is supplied to the spatial light modulator 26. Then, in accordance with the supplied image signal DV3, the spatial light modulator 26 modulates the luminous flux from the light source 22 so that the image including the menu image MI is projected through the projection optical system 24.

Accordingly, the projection part 12 projects the menu image MI according to the menu image signal DV4. Then, as the part in the projected menu image MI, the character array of the language type specified by the index appears.

The interface part 40 shown in FIG. 3, in accordance with the control by the first CPU 48A, sends the index, the language identifier LI, the command, and various data to the additional function part 2. Further, the first interface part 40 receives the index and the command from the additional function part 2. The first ROM 50A stores various software programs necessary for the operation of the main function part 1. Their software programs are expanded in the first RAM 52A, and executed by the first CPU 48A.

In the exemplary embodiment, the first index storing part 32 and the first CPU 48A may be expressed in a lump as a language specifying part.

Figure 4:
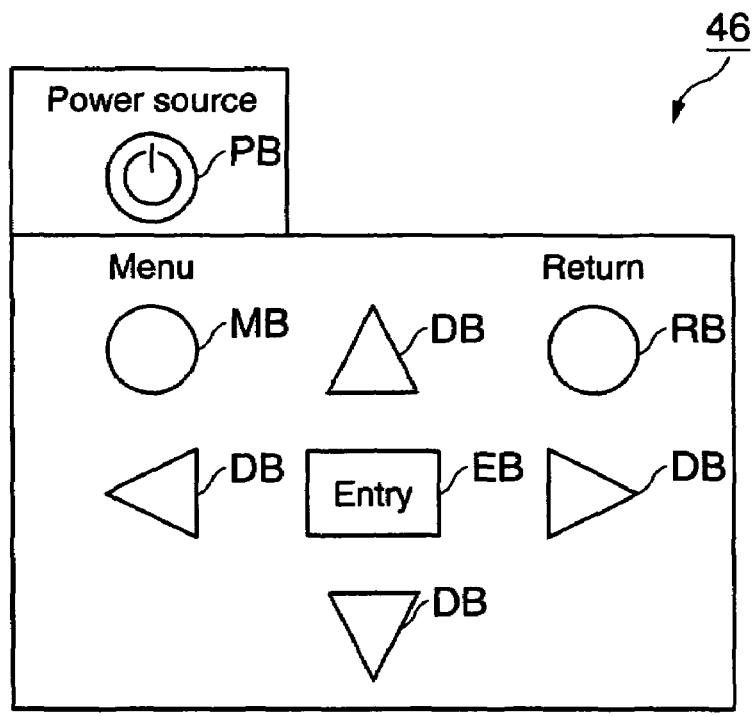
FIG. 4 is a schematic diagram showing an operation part.

The operation part 46 shown in FIG. 3 is provided on a housing of the projector PJ. Specifically, as shown in FIG. 4, the operation part 46 has a menu button MB for projecting the menu image MI (OSD menu), four pointing buttons DB for highlighting one of the parameters on the menu image MI, a decision button EB for selecting the highlighted parameter, and a back button RB for doing the selection of parameter over again. As described below, when the user pushes on the menu button MB, a menu display command is sent through the user interface part 44 to the first CPU 48A, and the menu image MI is projected. Namely, in case that the menu button MB is pushed on, the menu image MI is projected.

The operation part 46 further has a power button PB. When the power button PB is pushed on in a standby state of the projector PJ, the projector PJ starts. Here, the standby state is a state where the projector is not operating and a power plug of the projector is pushed into an electric plug receptacle. Further, the operation part 46 may be provided for a remote controller (not shown) of the projector PJ.

As shown in FIG. 3, the additional function part 2 has a second index storing part 56, a data table 58, an image data storing part 60, a second interface part 62, a network controller 64, a second central processing unit (CPU) 48B, a second ROM 50B, a second RAM 52B, and a second bus 54B connecting these parts communicatably. The second interface part 62 receives an index, a language identifier LI, a command, and various data from the main function part 1. Further, the second interface part 62, in accordance with the control by the second CPU 48B, transfers the index and the command to the main function part 1.

The second index storing part 56 stores the same index as the index that the first index storing part 32 stores.

The data table 85 is realized by a semiconductor memory unit that can be rewritten. Further, the data table 58 has a function of indicating what the language type of each language data set stored in each of the plural memory areas 28S is. Specifically, as shown in FIGS. 7A and 7B, the data table 58 stores the index and the language identifier LI stored in the memory area 28S that the index indicates in association with each other.

Figures 7A, 7B:
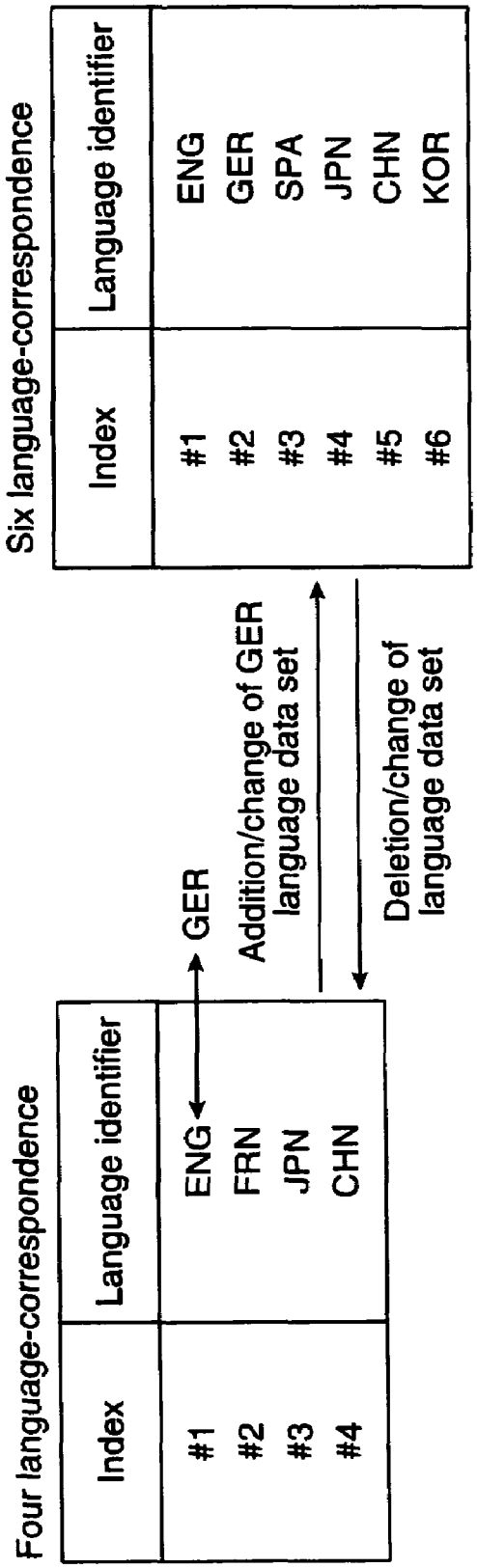
FIGS. 7A and 7B are schematic diagrams showing a data table.

Further, as shown in FIG. 7, in case that the language type of the language data set LDS in the memory area 28S has been changed, the data in the data table 58 is rewritten by the second CPU 48B so that the corresponding relation between the index and the language identifier LI is renewed. For example, as shown in FIG. 7A, in case that the English language data set LDS stored in the memory area 28S that the index #1 indicates is replaced with the German language data set LDS, the data table 58 associates the language identifier LI GER meaning German, in place of the language identifier LI ENG meaning English, with the index #1 and the stores the language identifier LI GER.

Further, as shown in FIG. 7, also in case that the number of the language data sets LDS increases or decreases by deletion or addition of the language data set LDS in the data defining part 28, the contents of the data table 58 are rewritten according to addition/deletion of the language data set LDS.

Further, the data table 58, according to the control by the second CPU 48B, outputs the language identifier LI corresponding to the index held in the second index storing part 56. Here, since the same index as the index in the first index storing part 32 is stored in the second index storing part 56, resultingly, the data table 58 outputs the language identifier LI corresponding to the index stored in the first index storing part 32.

Figure 8:
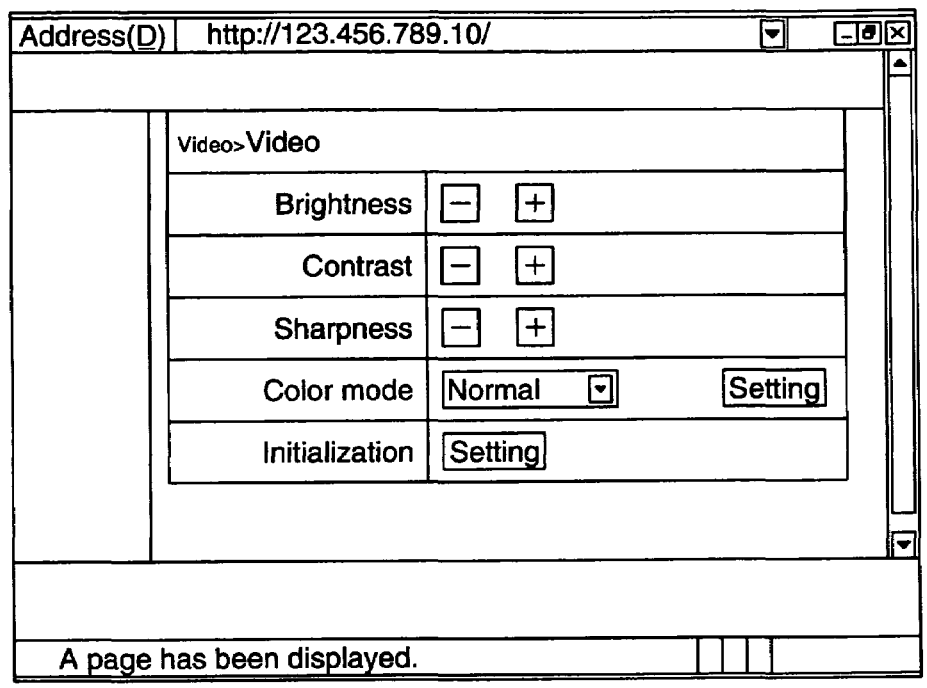
FIG. 8 is a schematic diagram showing a Japanese user interface image.
Figure 9:
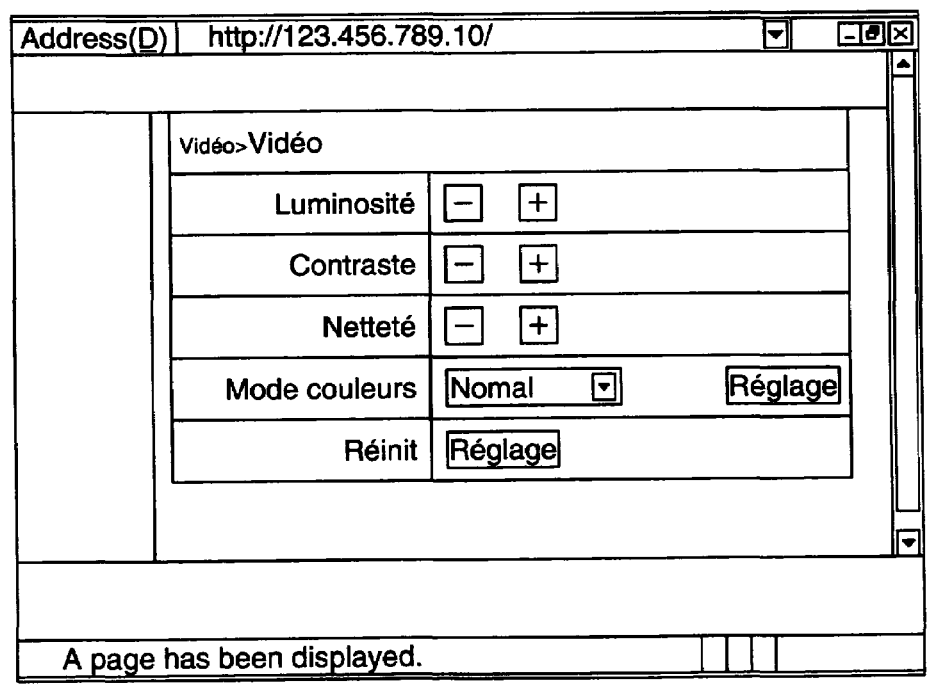
FIG. 9 is a schematic diagram showing a French user interface image.

The image data storing part 60 shown in FIG. 3 stores plural image data sets HL in association with the plural language identifiers LI. Each of the plural image data sets HL is data which a general web browser can display. Specifically, each of the plural image data sets HL includes a HTML file and a GIF file. Each of such the plural image data sets HL represents a user interface image as shown in FIG. 8 or 9. The user interface image belongs to the corresponding language type. Namely, the character array included in the user interface image belongs to the corresponding language type. Here, FIG. 8 shows a Japanese user interface image, and FIG. 9 shows a French user interface image. Further, both of FIGS. 8 and 9 show a state where the user interface image of each language is displayed in the web browser under English environment. These user interface images are to be displayed on the monitor screen of the computer PC1.

The image data storing part 60 is constituted so as to output, in case that it receives one language identifier LI, the image data set HL corresponding to the receiving language identifier LI. For example, in case that the image data set HL corresponding to the Japanese language type is sent through the network line NL to the computer PC1, the user interface image including Japanese character arrays as shown in FIG. 8 is displayed on the monitor screen of the computer PC1. Further, the user can set parameters such as brightness, contrast, sharpness, color mode, and the like through the user interface image shown in FIG. 8 or 9.

The network controller 64 shown in FIG. 3 includes a protocol and an IP address that are necessary for TCP/IP connection. Further, the network controller 64 communicates with the external computer PC1 through the network line NL. Further, the network controller 64, according to the control by the second CPU 48B, outputs the image data set HL from the image data storing part 60 to the network line NL.

The second ROM 50B shown in FIG. 3 stores various software programs necessary for the operation of the additional function part 2. Their software programs are expanded in the second RAM 52B, and executed by the second CPU 48B.

Figure 10:
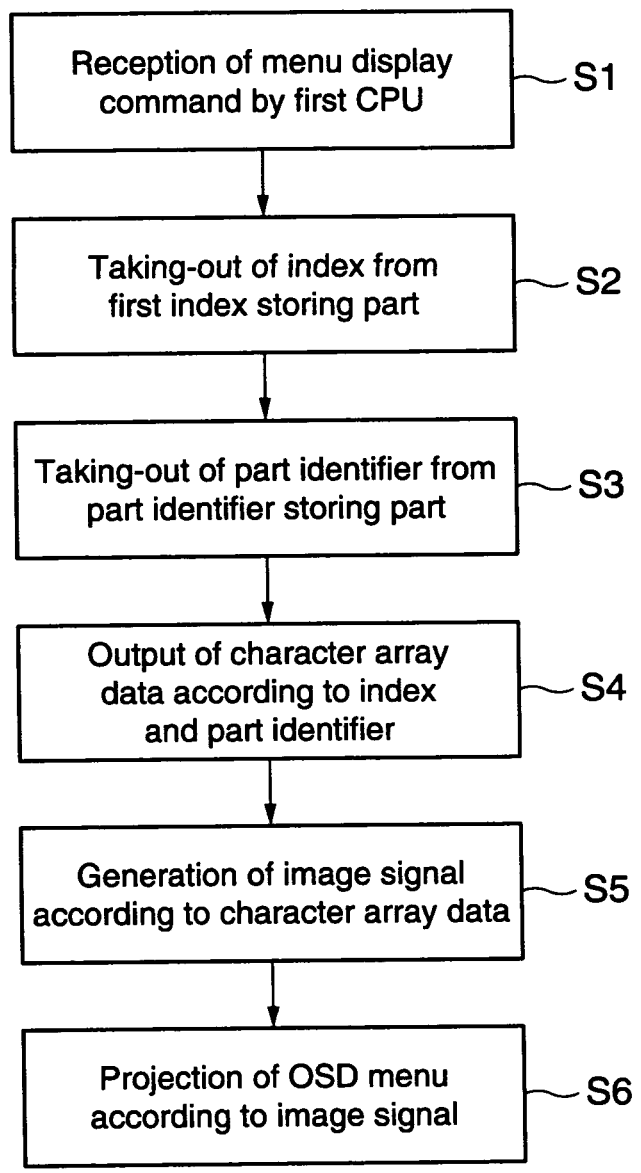
FIG. 10 is a flowchart of processing performed in case that the OSD menu is displayed.

With reference to FIG. 10, processing performed in case that the projector PJ projects the OSD menu will be described. When the menu button MB (FIG. 4) is pushed on by the user, the first CPU 48A receives, through the user interface part 44, a command DIS (menu display command) for displaying a menu image MI from the operation part 46 (step S1). Then, the first CPU 48A, according to the command DIS, takes out an index stored in the first index storing part 32 (step S2). Next, the first CPU 48A takes out all of part identifiers PI stored in the part identifier storing part 36 (step S3). Further, the first CPU 48A supplies the taken-out index and the part identifiers PI to the data defining part 28. Then, the data defining part 28 returns, from a memory area 28S that the supplied index indicates, the character array data CH associated with the supplied part identifiers to the first CPU 48A (step S4). Namely, the data defining part 28, according to the index held by the first index storing part 32, outputs the corresponding character array data CH.

Here, in the memory area 28S, a leading address of a portion where the character array data CH is stored may be used as the part identifier PI.

After the step S4, the image generating part 38, according to the character array data CH output by the data defining part 28, generates an image signal DV4 representing an OSD menu (step S5). In the embodiment, to the image generating part 38, in addition to the character array data CH, a control code corresponding to the character array data CH is also supplied through the first CPU 48A. In result, the image generating part 38, according to the supplied character array data CH and control code, generates the image signal DV4 representing the OSD menu. Here, the control code is data indicating a position in which a character array is displayed, the size of the character array, and the kind of font. The control code may be included in the character array data CH.

The image signal DV4 generated by the image generating part 38 is supplied to the projection part 12, whereby the projection part 12 projects the OSD menu (step S6). Here, as the part in the OSD menu, a character array that the character array data CH represents appears. Further, the language type of the character array in the projected OSD menu is the language type corresponding to the index held in the first index storing part 32.

Figure 11:
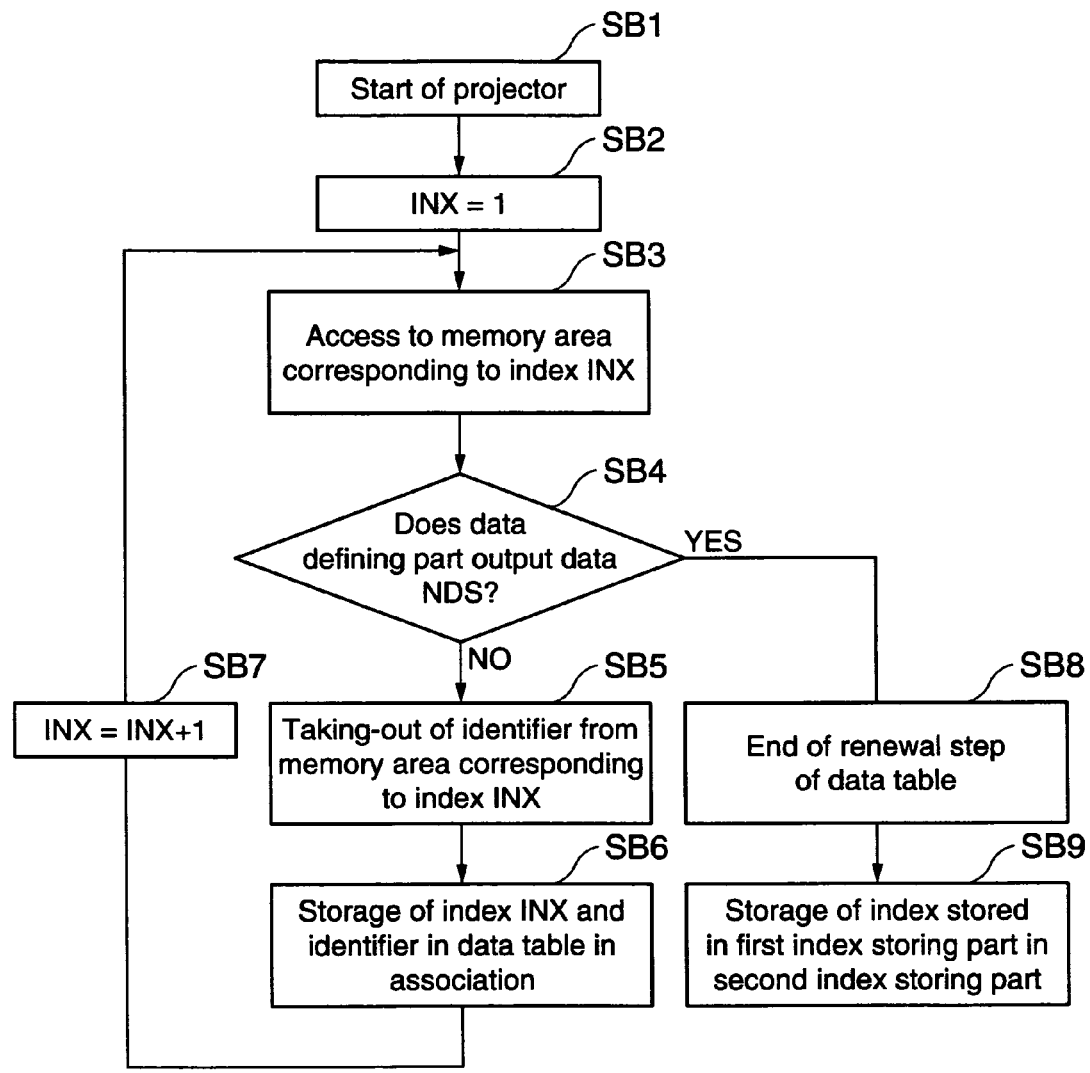
FIG. 11 is a flowchart showing a renewal step of the data table.
Figure 12:
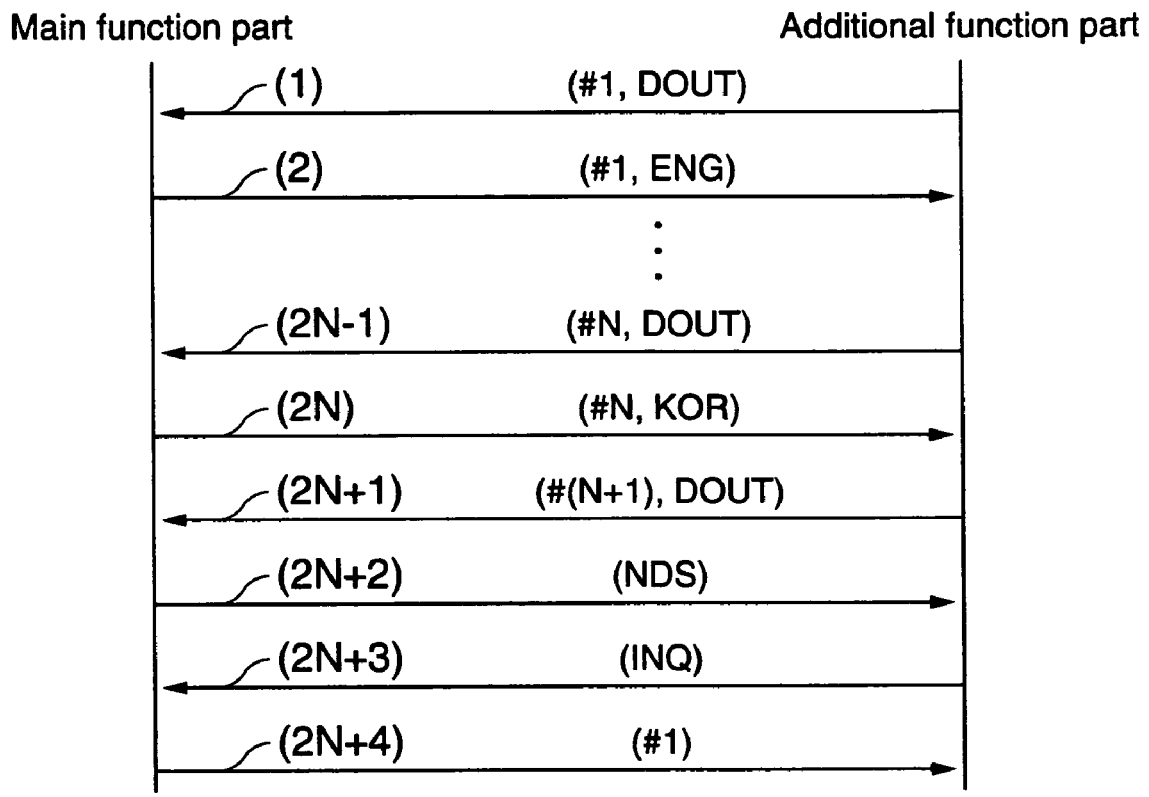
FIG. 12 is a schematic diagram showing the renewal step of the data table.

With reference to FIGS. 11 and 12, a step of the data table 58 renewal which is performed in case that a power of the projector PJ is switched on (in case that the projector starts) will be described.

Firstly, the projector PJ which is in a complete stop state or in a standby state starts (FIG. 11: step SB1). The complete stop state can mean a state where a power plug of the projector is out of an electric plug receptacle. Further, as described before, the standby state means a state where the power plug of the projector is inserted into the electric plug receptacle. In order to start the projector which is in the complete stop state, the user should insert the power plug into the electric plug receptacle, and should push on the power button PB in FIG. 4. In order to start the projector which is in the standby state, the user only pushes on the power button PB.

When the projector PJ starts, the additional function part 2 starts the renewal of data in the data table 58. Specifically, the second CPU 48B initializes variables INX representing the index. In the embodiment, by initialization, 1 is substituted in INX (FIG. 11: step SB2). Here, the variables INX are integral type variables.

Next, the second CPU 48B accesses to a memory area 28S that the INX-th index indicates (FIG. 11: step SB3). Specifically, as shown in processing (1) of FIG. 12, the second CPU 48B gives a set of an index #1 and an identifier output command DOUT to the data defining part 28. Here, in case that the language data set LDS is not stored in the memory area 28S that the INX-th index indicates, the data defining part 28 returns the data NDS to the second CPU 48B.

In case that the data defining part 28 does not output the data NDS (FIG. 11: step SB4 NO), the second CPU 48B receives the language identifier LI from the memory area 28S that the INX-th index indicates (FIG. 11: step SB5). Then, the second CPU 48B stores the receiving language identifier LI in the data table 58 in association with the INX-th index (FIG. 11: step SB6).

Specifically, as shown in processing (2) of FIG. 12, the data defining part 28 outputs a set of the index #1 and an identifier ENG in place of the data NDS. Further, the second CPU 48B stores the receiving language identifier ENG in the data table 58 in association with the index #1.

After the step SB6, the second CPU 48B increases the INX by one, and obtains INX representing the next index (FIG. 11: step SB7). Next, the processing returns to the step SB3. As long as the step SB4 is NO, the steps SB5, SB6, SB7, and SB3 are repeated. In result, the language identifiers LI are transferred from all of the memory areas 28S to the data table 58.

Specifically, up to processing (2N) of FIG. 12, N-number language identifiers LI corresponding to N-number indexes are transferred to the data table 58. The transferred language identifiers LI are associated with the corresponding indexes and stored in the data table 58.

On the other hand, in case the language data set LDS is not stored in the memory area 28S that the INX-th index specifies, the data defining part 28 returns the data NDS (FIG. 11: step SB4 YEST). Specifically, as shown in processing (2N+1) of FIG. 12, the second CPU 48B gives a set of the index #1 (N+1) and an identifier output command DOUT to the data defining part 28. Then, as shown in processing (2N+2) of FIG. 12, the data defining part 28 returns the data NDS.

The second CPU 48B, in case that it receives the data NDS, ends the renewal step of the data table 58 (FIG. 11: step SB8).

By such the renewal step, in the data table 58, the language identifier LI associated with the index is stored. After such the renewal step, the second CPU 48B can judge, with reference to the renewed data table 58, what the type of character array data CH stored in the memory area 28S that the index indicates is.

Further, sequentially to the step SB8, the second CPU 48B performs renewal of the second index storing part 56 (FIG. 11: step SB9). Specifically, as shown in processing (2N+3) of FIG. 12, the second CPU 48B gives a command INQ to the first index supply part. Then, as shown in processing (2N+4) of FIG. 12, according to the command INQ, the first index supply part returns the index storing at that time to the second CPU 48B. Next, the second CPU 48B stores the returned index in the second index storing part 56. Thus, the second CPU 48B takes out the index held in the first index storing part 32 through the second interface part 62, and stores its taken-out index in the second index storing part 56. After such the renewal step of the second index storing part 56, the second CPU 48B can judge, with reference to the second index storing part 56, what the language type of the present OSD menu is.

Figure 13:
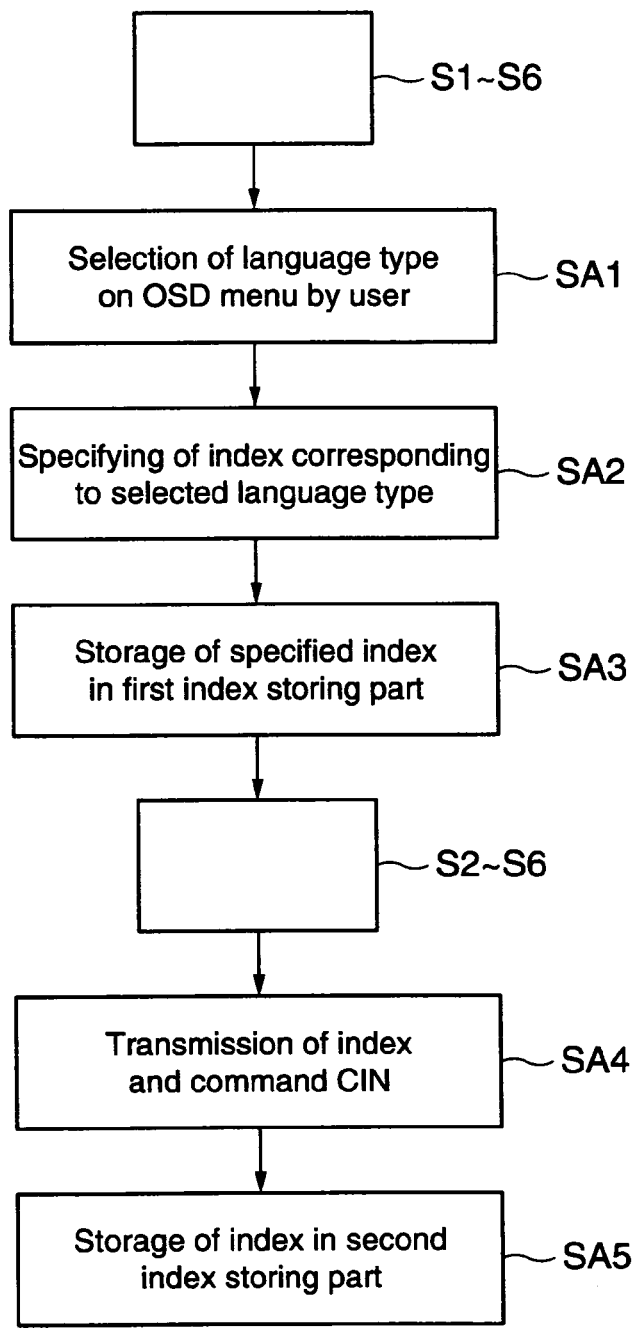
FIG. 13 is a flowchart of processing performed in case that a user changes a language type.
Figure 14:
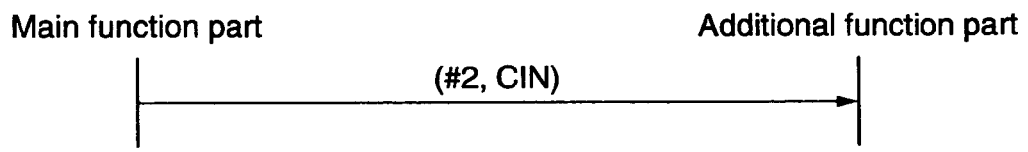
FIG. 14 is a schematic diagram showing a renewal step of a second index storing part in case that a user changes setting.

With reference to FIGS. 13 and 14, processing performed in case that the user changes the language type will be described.

The user causes the projector PJ to execute the above steps S1 to S6. Hereby, the projector PJ projects the OSD menu. The projector PJ causes the user to select/change the language type of the OSD menu through the language menu that is a part of the OSD menu (step SA1). Specifically, the projector PJ causes the user to select one of the plural bit map images BID listed in the language menu. Here, as described above, since the bit map image BID displays the language type with the characters that the user can understand, the user can understand which bit map image BID corresponds to which language type. As described above, by operating the pointer button and the decision button in FIG. 4, the user can select the language type on the OSD menu.

In case that the user selects one bit map image BID to select the language type of his desire, the first CPU 48A judges the memory area 28S corresponding to the selected bit map image BID, and specifies the index assigned to the judged memory area 28S (step SA2). Next, the first CPU 48A replaces the index stored in the first index storing part 32 with the specified index (step SA3). Sequentially to replacement of the index in the first index storing part 32, the first CPU 48A performs the steps S2 to S6 again. Since the steps S2 to S6 are performed after the step SA3, as soon as the language type is changed, the character array in the projected OSD menu changes to the character array of the corresponding language type.

Further, after the step S6, the first CPU 48A sends an index newly stored and an index storing command CIN through the first interface part 40 to the second CPU 48B (step SA4). Upon reception of the command CIN, the second CPU 48B stores the receiving index in the second index holding part (step SA5). In result, even after the user has changed the language type of the OSD menu, the second CPU 48B can judge properly which the memory area 28S in which the language data set LDS used in display of the OSD menu is stored is, on the basis of the index in the second index storing part 56. Further, processing shown in FIG. 14 corresponds to the steps SA4 and the steps SA5.

Figure 15:
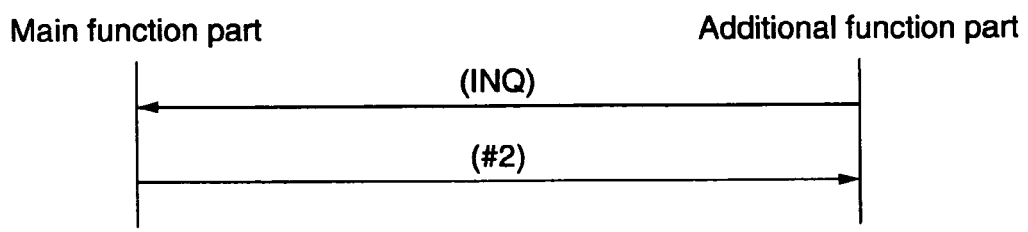
FIG. 15 is a schematic diagram showing a renewal step of the second index storing part in case that an additional function part inquires user setting.

Further, in the exemplary embodiment, the additional function part 2 has also a function of inquiring of the main function part 1 the language type at the predetermined intervals. Specifically, as shown in FIG. 15, the second CPU 48B outputs a command INQ to the first index storing part 32 at some timing. Then, according to the command INQ, the first index storing part 32 returns the index to the second CPU 48B. Next, the second CPU 48B stores the index from the first index storing part 32 in the second index storing part 56.

By the above renewal step, the second index storing part 56 can always store the same index as the index in the first index storing part 32.

Figure 16:
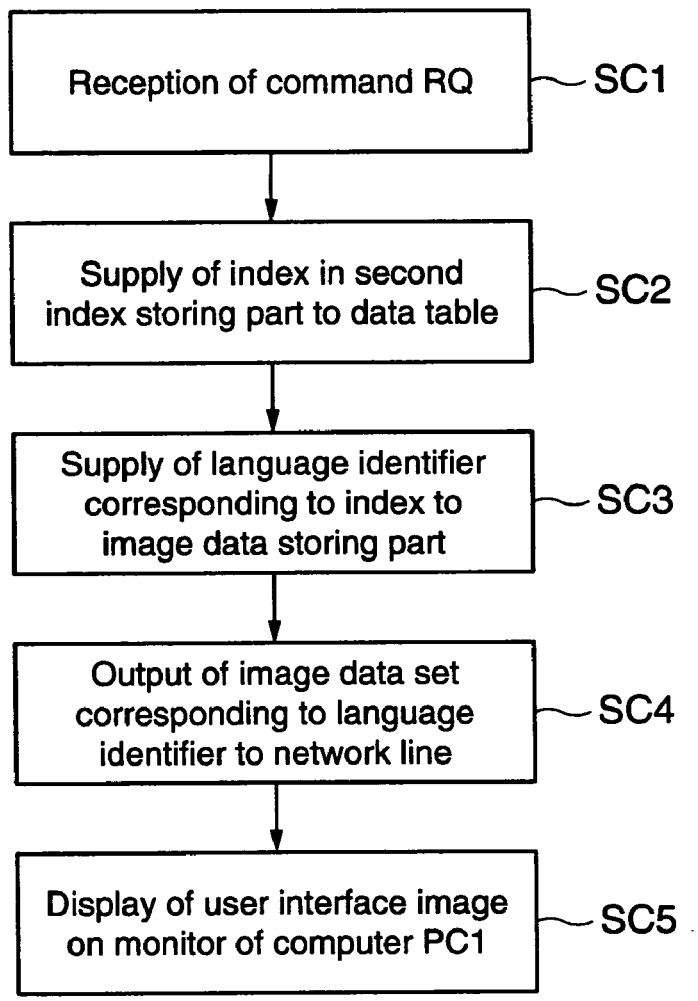
FIG. 16 is a flowchart for causing a computer PC1 to display a user interface image.

With reference to FIG. 16, according to a request from the computer PC1, a step in which the additional function part 2 outputs the image data set HL will be described.

The second CPU 48B receives, through the network controller 64, from the computer PC1 on the network line NL, a command RQ or a request for providing image data (step SC1). Upon reception of the command RQ, the second CPU 48B takes out the index held in the second index storing part 56, and supplies the taken-out index to the data table 58 (step SC2). The data table 58 returns the language identifier LI associated with the supplied index to the second CPU 48B. Then, the returned language identifier LI is supplied through the second CPU 48B to the image data storing part 60 (step SC3). The image data storing part 60 outputs the image data set HL of the language type corresponding to the supplied language identifier LI. The output image data set HL is supplied through the second CPU 48B to the network controller 64. Next, the network controller 64 directs the supplied image data set HL to the computer PC 1 and outputs it to the network line NL (step SC4). In result, the user interface image belonging to the same language type as the language type of the OSD menu is displayed on the monitor screen of the computer PC1 (step SC5).

According to the above embodiment, the additional function part 2 has the second index storing part 56. However, if the data table 58 in the additional function part 2 outputs the language identifier LI corresponding to the index stored in the first index storing part 32, the second index storing part 56 may be omitted. In case that the second index storing part 56 is omitted, the second CPU 48B should supply the index stored in the first index storing part 32 to the data table 58 through the second interface part 62. However, in case that the additional function part 2 has the second index storing part 56, it is not necessary for the second CPU 48B to access to the first index storing part 32 (that is, memory in the main function part 1) each time the second CPU 48B receives the command RQ from the computer PC1. Therefore, the control can become easier.

According to the above exemplary embodiment, the network line NL in the projector system PS is Internet or LAN. However, it should be understood that the invention is not limited to such the form. Specifically, in case that the personal computer PC2 in FIG. 1 can communicate with the projector PJ with accordance with DDC (Display Data Channel) standard, a signal line connecting the projector PJ and the personal computer PC2 can become the network line in the invention. In case that the invention is applied to such the projector system PS, data relating to the projector PJ is displayed on the monitor screen of the personal computer PC2 with the same language type as the language type of the OSD menu.

Though the projector PJ in the above embodiment is a front projection-type projector, it may be a rear projection-type projector (a so-called rear projector). This is because if the main function part 1 and the additional function part 2 are provided for the rear projection-type projector, the same effect as the effect obtained in the above embodiment can be obtained.

Further, the projector PJ in the above embodiment may be replaced with a direct-vision type display device. Here, the direct-vision type display device includes a CRT monitor, a liquid crystal monitor, an electroluminescence display, a plasma display, SED (Surface-Conduction Electron-Emitter Display), and FED (Field Emission Display).

Further, according to the above embodiment, the spatial light modulator 26 in the projector PJ has the liquid crystal light bulb. However, as long as the projection optical system 24 and the driver circuit are appropriately changed, the spatial light modulator 26 may have DMD (Digital Micromirror Device). Even in such the projector, if the main function part 1 and the additional function part 2 as described in the above embodiment are provided, the same effect as the effect obtained in the above embodiment can be obtained. The DMD is a trademark of the US Texas Instruments Inc.

According to the above exemplary embodiment, the additional function part 2 outputs the image data set HL according to the language identifier LI to the network line NL. However, in place of the image data set HL, the language identifier LI itself representing the language type of the OSD menu may be output to the network line NL. Such the constitution can make the computer PC1 connected to the network NL recognize, on the basis of the language identifier LI, what the language type of the OSD menu of the projector PJ is. Naturally, the additional function part 2 may supply the image data set HL and the corresponding language identifier LI as a set to the network line NL.

What is claimed is:

1. A projector, comprising:
  a projection part that projects a menu image including at least one part according to an image signal, the menu image being an interface that enables a user to interactively adjust parameters of images projected by the projector;
  a selection part that causes the user to select a language type of the menu image;
  a menu image processing part that generates the image signal so that a character array of the selected language type can appear in the menu image as a part, the menu image processing part comprising:
    a first interface unit;
  an additional function part that outputs an image data set to a network line, the additional function part comprising:
    a second interface unit connected to the first interface unit, and
    a network interface unit connected to the network line;
  a data defining part including plural memory areas that store respectively character array data of respective language types, in which plural indexes are assigned to the plural memory areas one by one;
  a first index storing part that stores one of the plural indexes according to the selection by the user;
  a first CPU which takes out, according to the stored index, the character array data from the corresponding memory area in case that a command for projecting the menu image is given; and
  an image generating part that generates the image signal according to the taken-out character array data so that the character array can appear in the menu image as the part,
  the additional function part outputting the image data set corresponding to the selected language type to the network line, so that a computer connected to the additional function part through the network line can display data relating to the projector on a monitor screen of the computer, with the selected language type, the displayed data including a user interface image for setting a parameter of the projector.

2. The projector according to claim 1, each of the plural memory areas further storing each identifier indicating the language type of the character array data stored in each of the plural memory areas.

3. The projector according to claim 2, the additional function part further comprising:
a data table that stores the plural indexes and the respective identifiers in a corresponding relation;
a second CPU that takes out, according to the index stored in the first index storing part, the corresponding identifier from the table data in case that a predetermined command is given through the network line; and
an image data storing part that outputs the image data set representing the data according to the taken-out identifier.

4. The projector according to claim 3, the data table receiving each identifier stored in each of the plural memory areas in start of the projector, and storing the plural indexes and the respective identifier in a corresponding relation.

5. The projector according to claim 3, the additional function part has a second index storing part that stores a same index as the index stored in the first index storing part; and
the second CPU taking out, according to the index stored in the second index storing part, the corresponding identifier from the data table.

6. The projector according to claim 5, in case that the index stored in the first index storing part has been changed according to selection of the language type by the user, an index after change stored in the first index storing part is transferred to the second index storing part so that the second index storing part stores the index after change.

7. The projector according to claim 5,
the index stored in the first index storing part being transferred to the second index storing part at the predetermined timing so that the second index storing part can store the same index as the index stored in the first index storing part.

8. A control method of a projector that is provided with a projection part that projects, according to an image signal, a menu image including at least one part, the projector including a data defining part having plural memory areas that store respectively character array data of respective language types, in which plural indexes are assigned to the plural memory areas one by one, the projector further including a first index storing part, the method comprising:
causing a user to select a language type of the menu image, the menu image being an interface that enables the user to interactively adjust parameters of images projected by the projector;
generating the image signal by a menu image processing part so that a character array of the selected language type can appear as a part in the menu image;
receiving the image signal by an additional function part from the menu image processing part; and
outputting, by the additional function part, an image data set through a network interface part to a network line, the image data set corresponding to the selected language type so that a computer connected to the network line can display, on a monitor screen of the computer, data relating to the projector with the selected language type, the displayed data including a user interface image for setting a parameter of the projector,
the generating the image signal further including:
storing one of the plural indexes in the first index storing part according to the selection by the user,
taking out the character array data from the corresponding memory area according to the index stored in the first index storing part, and
generating the image signal, according to the taken-out character array data, so that the character array can appear as the part in the menu image.

9. The control method according to claim 8,
each of the plural memory areas further storing each identifier indicating the associated language type;
the projector further including a data table that stores the plural indexes and the respective identifiers in a corresponding relation; and
outputting the image data set further including taking out, according to the index stored in the first index storing part, the corresponding identifier from the data table, and outputting, according to the taken-out identifier, the image data set representing the data to the network line.

10. The control method according to claim 9, outputting the image data set further including taking out, in start of the projector, each identifier stored in each of the plural memory areas, and storing the plural indexes and the respective identifiers in the data table in a corresponding relation.

11. The control method according to claim 9,
the projector having a second index storing part; and
taking out the corresponding identifier from the data table further including storing the same index as the index stored in the first index storing part in the second index storing part, and taking out, according to the index stored in the second index storing part, the corresponding identifier from the data table.

12. The control method according to claim 11, taking out the corresponding identifier from the data table further including, in case that the index stored in the first index storing part has been changed according to selection of the language type by the user, transferring an index after change stored in the first index storing part to the second index storing part so that the second index storing part stores the index after change.

13. The control method according to claim 11, taking out the corresponding identifier from the data table further including transferring the index stored in the first index storing part to the second index storing part at the predetermined timing so that the second index storing stores the same index as the index stored in the first index storing part.

14. A projector, comprising:
a projection part that projects a menu image including at least one part according to an image signal;
a selection part that causes a user to select a language type of the menu image, the menu image being an interface that enables the user to interactively adjust parameters of images projected by the projector;
a menu image processing part that generates the image signal so that a character array of the selected language type can appear as a part in the menu image, the menu image processing part including a first interface part;
an additional function part to be connected to a network line, the additional function part including a second interface part connected to the first interface part and a network interface part connected to the network line;
a data defining part including plural memory areas that store respectively character array data of respective language types, in which plural indexes are assigned to the plural memory areas one by one;

a first index storing part that stores one of the plural indexes according to the selection by the user;

a first CPU which takes out, according to the stored index, the character array data from the corresponding memory area in case that a command for projecting the menu image is given; and an image generating part that generates the image signal according to the taken-out character array data so that the character array can appear in the menu image as the part, the additional function part outputting a language identifier representing the selected language type to a computer connected to the network line, wherein the computer is located external to the projector.

15. The projector according to claim 1, the menu image processing part comprising a data definition part including plural memory areas that store a language data set having respectively character array data of respective language types, wherein the menu image processing part generates the image signal according to the taken-out character array data corresponding to the character array based on the selected language type so that the character array can appear in the menu image as the part, and the language data set can be replaced with a language data set of another language type supplied from an external data processing device.

16. The projector according to claim 14, the menu image processing part comprising a data definition part including plural memory areas that store a language data set having respectively character array data of respective language types, wherein the menu image processing part generates the image signal according to the taken-out character array data corresponding to the character array based on the selected language type so that the character array can appear in the menu image as the part, and the language data set can be replaced with a language data set of another language type supplied from an external data processing device.

* * * * *